Aug. 3, 1965   R. M. CHAPMAN   3,197,879
GAUGE FOR LOCATING THE EQUATOR OF A SPHERICAL CAVITY
Filed Aug. 23, 1961   2 Sheets-Sheet 1

INVENTOR.
RICHARD M. CHAPMAN
BY
ATTORNEY

Aug. 3, 1965  R. M. CHAPMAN  3,197,879
GAUGE FOR LOCATING THE EQUATOR OF A SPHERICAL CAVITY
Filed Aug. 23, 1961  2 Sheets-Sheet 2

INVENTOR.
RICHARD M. CHAPMAN
BY Edward A. Sokolski
ATTORNEY

United States Patent Office 3,197,879
Patented Aug. 3, 1965

3,197,879
GAUGE FOR LOCATING THE EQUATOR OF
A SPHERICAL CAVITY
Richard M. Chapman, Arcadia, Calif., assignor to
North American Aviation, Inc.
Filed Aug. 23, 1961, Ser. No. 133,461
5 Claims. (Cl. 33—174)

This invention relates to a gauge for locating the equator of a spherical cavity and more particularly to such a gauge by means of which the deviation of a surface of a member having a spherical cavity formed therein from the equator position of this cavity can be precisely determined.

In a precision instrument such as a gyroscope, it is necessary that the dimensional tolerances be precisely maintained. The tolerances become especially critical where relatively moving opposing surfaces are involved. In a device such as a free-rotor gyroscope, in which a gas bearing is utilized to support the rotor, this gas bearing being formed between a closely spaced ball and spherical cavity, it is essential that very close tolerances be maintained on the dimensions of the spherical cavity and the ball. A free-rotor gyroscope of this type is described in co-pending application Serial No. 641,720 entitled "Free-Rotor Gyroscope," Donald P. Duncan et al., inventors, filed February 21, 1957 and assigned to North American Aviation, Inc. In this application, an embodiment of a free-rotor gyroscope is described in which the rotor is fabricated in two halves, each of these halves having a hemispherical cavity formed therein. The rotor is supported on an air bearing formed between the cavities formed therein and a ball which is fixedly attached to the gyro case.

In fabricating the two halves of the rotor, it is essential for proper operation of the gyroscope, that the dimensions of the spherical cavity surfaces and their relationship to the flat surfaces of the rotor halves adjacent to these cavities be held to very close tolerances. In most applications, the flat surface must be close to the location of the equator of the spherical cavity, generally just a little beyond the location of the equator position to assure proper clearance between the rotor and the fixed ball. To fabricate the rotor halves for such close tolerances requires high precision measuring means for determining the location of the equator line. The device of this invention provides means for precisely measuring the deviation of the position of the flat surface of such a rotor halve from the true equator position.

It is therefore an object of this invention to provide an improved gauge for measuring the equator position of a spherical cavity.

It is a further object of this invention to increase the precision in the fabrication of members having spherical cavities formed therein.

It is still another object of this invention to facilitate the fabrication of a precision free-rotor gyroscope.

It is still a further object of this invention to provide improved means for determining the deviation of the position of a surface of a member from the equator position of a spherical cavity formed in said member adjacent to the surface.

Further objects of this invention will become apparent from the following description taken in connection with the accompanying drawings of which FIG. 1 is a perspective view of a preferred embodiment of the device of the invention;

Figure 4:
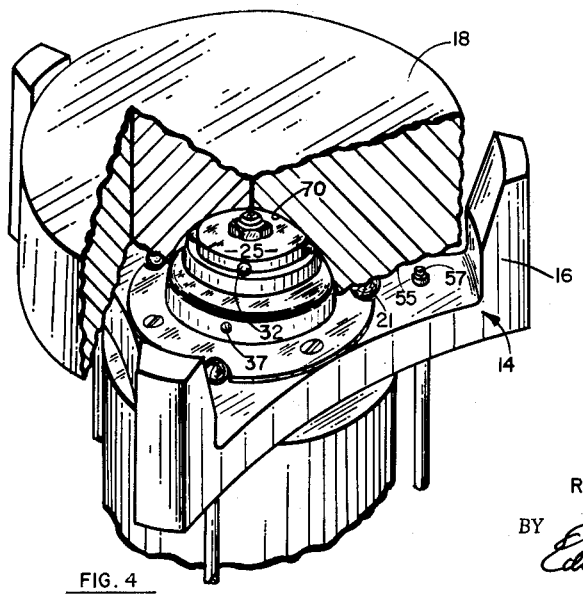

And FIG. 4 is a perspective view with partial cut-away section of the preferred embodiment of the device of the invention being used to make equator measurements.

Referring now to the various figures illustrating the preferred embodiment of the device of the invention, support fixture 14 is threadably attached to stand or base 11 by means of threaded portions 75. Support means for member 18 (see FIG. 4), the spherical cavity of which is to be gauged, is provided by support fixture 14 which has three fingers 16 located at substantially 120° angles relative to each other for guiding member 18. Member 18 is positioned in the center of the fixture by means of three set screws 37 having spherically shaped ends which project beyond the surface of member 30. Three balls 21 are positioned in cavities 24 formed in fixture 14 and fixedly attached to the fixture by cementing or other suitable means. Balls 21 are located at 120° angles relative to each other. Plunger assembly 25 is slidably mounted in support fixture 14 with the plunger shaft 27 free for movement relative to member 30 which forms part of support fixture 14.

Plunger assembly 25 has three balls 32 positioned within recesses 35 formed therein and fixedly attached to the plunger assembly by cementing or other suitable means. Plunger assembly 25 further has a ball 38 with a flattened portion attached thereto at the end of shaft 27. The flattened portion of ball 38 is contiguous with ball 40 which is fixedly attached to movable shaft 42 of position detecting means 45. A flexible diaphragm 39 is fixedly attached to the bottom of shaft 27 and member 30 to prevent sidewise motion of the shaft while permitting vertical displacement relative to member 30.

Position detecting means 45 may comprise an inductive pickoff having a ferrite core 42 which is slidably mounted relative to case 48. Slidable core 42 is urged upward by spring means (not shown) so that ball 40 pushes upward against ball 38. The case 48 of detecting means 45 is securely held to stand 11 by means of lock screw 50.

Figure 3:
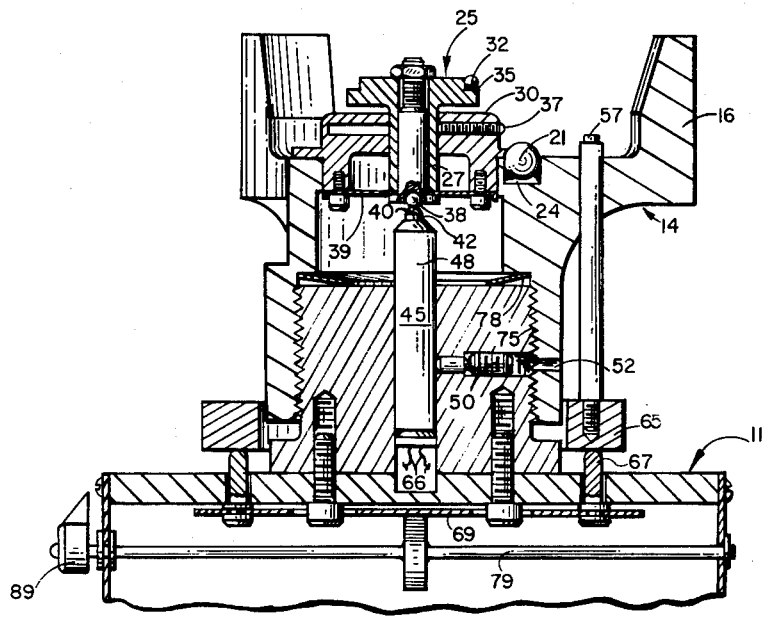
FIG. 3 is a cross-sectional view of the preferred embodiment of the device of the invention as viewed along the plane indicated by the line 3—3 in FIG. 2.

Referring to FIGS. 3 and 4, the determination of the deviation of a flat surface 55 of a member having a spherical cavity 70 formed therein from the equator position of the cavity is accomplished as follows: The instrument is first calibrated by utilizing a standard reference member in which the desired relationship between surface 55 and the cavity exists. This reference member must have the desired shape and size cavity 70. This reference member is placed in fixture 14 with flat surface 55 supported on balls 21. Before flat surface 55 of member 18 comes into contact with balls 21 it first strikes against rods 57 which are slidably mounted in support fixture 14 and fixedly attached to ring 65. With the weight of member 18 on rods 57, ring 65 will rotate cam 67 until rods 57 will be forced down to the point where surface 55 will come into contact with balls 21. This mechanism provides a cushioning effect which prevents sharp contact between surface 55 and the balls 21 which might abrade either the balls or the surface to adversely affect the precision dimensions thereof.

As surface 55 approaches balls 21, the spherical surface of cavity 70 will come into contact with balls 32 mounted in plunger assembly 25. Plunger assembly 25 will therefore be forced downward with the downward motion of member 18 until flat surfaces 55 come to rest on balls 21. At this point with plunger 25 being urged downward by the spherical cavity surface, the position of the plunger will be an indication of the distance between the surface of the spherical cavity contacted by balls 32 and surface 55.

Figure 1:
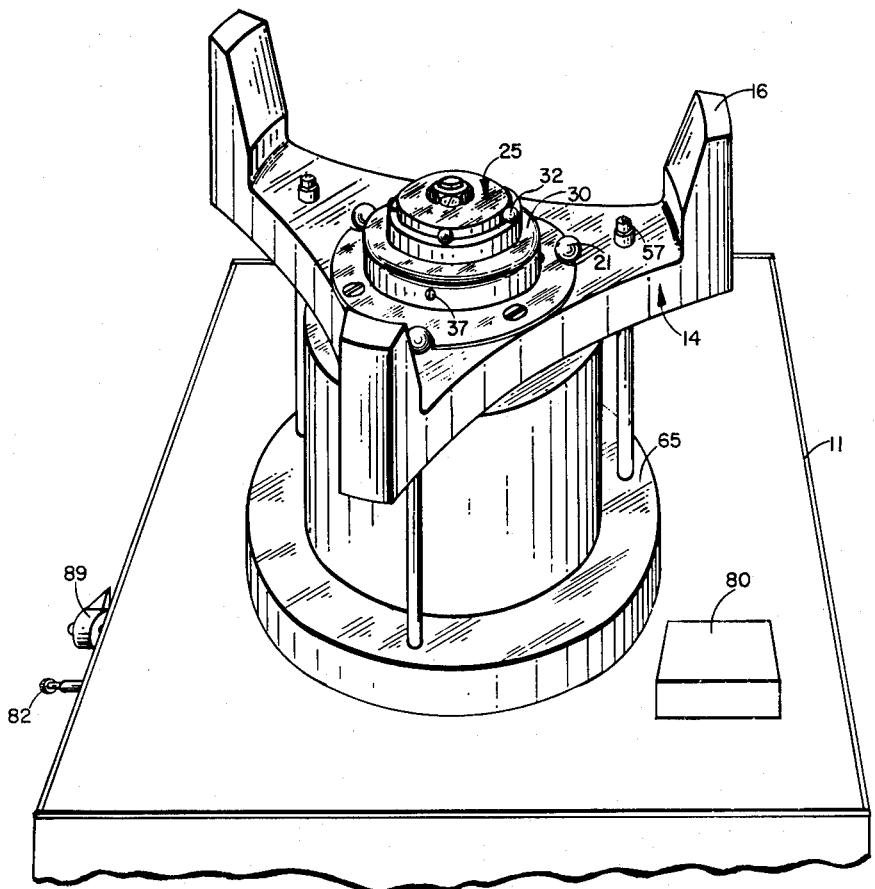
Figure 2:
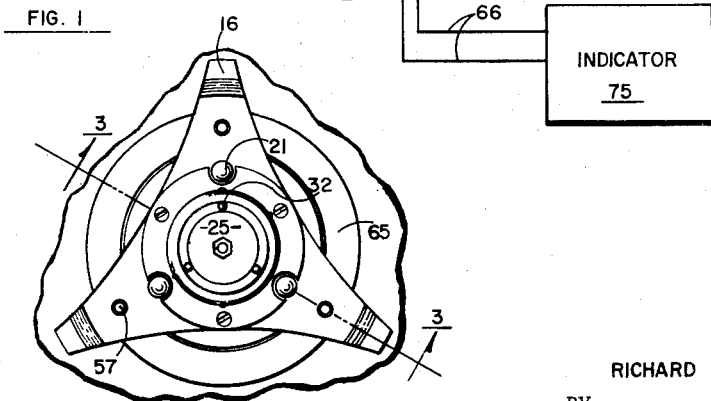
FIG. 2 is a top view of the embodiment illustrated in FIG. 1.

The output of transducer 45, which as indicated, may be an inductance whose core position is varied in accordance with the position of plunger 25, is fed on lead wires 66 to indicator 75 (see FIG. 1). Indicator 75 may comprise a standard A.-C. bridge which may be used to measure the inductance of inductive transducer 45 and an appropriate amplifier and current meter whose readings precisely indicate the inductance of transducer 45. Bridge circuits which can be used for this purpose are described on pages 902 et seq., of the Radio Engineers Handbook by F. E. Terman published by McGraw-Hill Book Company. A suitable commercially available transducer and indicator means which may be utilized are the Electro-jet pickoff and the Accutron amplifier manufactured by the Sheffield Corporation, Dayton Ohio. Any device which will operate with plunger mechanism 25 to give an accurate indication of its relative displacement may be utilized. A commercially available completely mechanical device which has been found to operate quite satisfactorily with plunger 25 is the "Mikrokater" manufactured by the C. E. Johanssen Company of Eskelstuna, Sweden.

To assure an accurate measurement, member 18 must be properly seated on ball supports 21. To assure such seating, it has been found that vibration of the stand by means of a vibrator 80 is desirable (see FIG. 1). Vibrator 80 may be a standard audio frequency buzzer which is fixedly attached to stand 11 and can be actuated to provide a vibration in the low frequency audio range by pressing button 82.

With an accurate measurement reading obtained on the master or reference member, the member to be checked for equator position should then be inserted in fixture 14 in the same fashion described for the reference member. Any deviation in the equator dimension of the members to be verified from those of the reference member can then be ascertained. Of course, it is assumed that the member being measured has the desired spherical cavity dimension corresponding to that of the reference member. With the device of this invention, deviations in the dimensions of units to be tested of as little as several micro-inches from the dimensions of a standard unit can be ascertained.

In making such precise measurements it is essential that even the most minute factors be taken into consideration. In addition, great care must be taken not to mar the surfaces of the members being tested to insure their precision capabilities. Such precision is maintained by such features of the device of the invention as, for example, the utilization of ball contacts 21 and 32 to contact member 18 to minimize the contact surface involved and the possibilities of the transfer of foreign matter to member 18 or the abrasion of this member. In addition, the chances of marring the flat surface 55 of member 18 are lessened by means of cushioning rods 57. The use of vibrator 80 to assure the settling of member 18 on the ball contact further enhances the accuracy of the measurements obtained.

The calibration of the gauge can be varied slightly by rotating holding fixture 14 relative to stand 11 on threads 75. This, it can be seen, will change the relative position between the case of transducer 45 and balls 21 and thereby will change the output reading from transducer 45 for any given relative position between balls 21 and 32. To enhance accuracy, threads 75 are preloaded by means of bowed washer 78.

The case 48 of transducer 45 is attached to stand 11 by means of locking screw 50. The calibration of transducer 45 can be broadly adjusted by changing the position of case 48 relative to stand 11. Access to screw 50 is provided by means of aperture 52.

When cam 67 is rotated by ring 65, with the insertion of member 18 in the fixture, rod 79 is similarly rotated by means of the linkage between it and rod 69. After the member is removed from the fixture, the knob 89 which is fixedly attached to rod 79 should be rotated to bring cam 67 to a position in contact with ring 65 to provide the desired cushioning effect with the next insertion of a member to be tested.

The device of this invention thus provides high precision means for determining the deviation of the position of a flat surface of a member from the position of the equator of a spherical cavity formed in said member. Such measurements can be made to an accuracy of within several micro-inches.

While the invention has been described and illustrated in detail, it is to be clearly understood that this is by way of illustration and example only and is not intended by way of limitation. The spirit and scope of the invention being limited only by the terms of the appended claims.

I claim:

1. A gauge for determining the deviation of a surface of a gauged member from the position of the true equator of a spherical cavity formed in said member comprising a stand; a plurality of balls, defining a plane fixedly attached to said stand, said balls being adapted to be contiguous with the surface of said gauged member; plunger means slidably supported in said stand, said plunger means including a plurality of balls fixedly attached to the outer surface thereof and defining a spherical surface, said balls being adapted to contact the sides of said spherical cavity; detector means operatively connected to said plunger means for detecting motion of said plunger relative to said stand; and indicator means responsive to the output of said detector means for indicating the displacement of said plunger means relative to said support stand, whereby said indicator means indicates deviation of the flat surface of said member from the equator position of said cavity.

2. A gauge for determining the deviation of the position a flat surface of a gauged member from the equator position of a spherical cavity formed in said member comprising a base having a plurality of spherical members defining a plane, fixedly attached to said base and projecting from one surface thereof; a plunger assembly slidably mounted in said base for motion normal to said plane; means for urging said plunger assembly along an axis normal to said plane in the direction of projection of said spherical members, said plunger assembly including a plurality of spherical members fixedly attached to said plunger assembly, defining a hemisphere which is symmetrical about said axis of said plunger, and adapted to be contiguous with the sides of a hemispherical cavity in a gauged member; and means responsive to motion of said plunger relative to said base for indicating deviation of the position of the flat surface of said gauged member from the position of the equator of the spherical cavity in said gauged member.

3. A gauge for determining the deviation of the position of a flat surface from the equator position of a spherical cavity formed in said surface comprising a base having at least three balls fixedly attached thereto, defining a plane, and projecting from one surface thereof; a plunger assembly slidably mounted in said base for translation along an axis normal to said plane; means for urging said plunger assembly along said axis in the direction of projection of said balls; said plunger assembly including at least three balls defining a spherical surface and fixedly attached to said plunger assemblies, vibrator means on said base for vibrating said base; and means responsive to motion of said plunger relative to said base for indicating deviation of the position of the flat surface of a gauged member from the position of the equator of its spherical cavity.

4. A gauge for determining the deviation of the position of a flat surface of a gauged member from the equator position of a spherical cavity formed in said member comprising a base having three balls, defining a reference plane fixedly attached thereto and projecting from one surface thereof, said balls being positioned at substantially 120° intervals around an axis normal to said plane; a plunger assembly slidably mounted in said base for translation along said axis means for urging said plunger assembly along said axis in the direction of projection of said balls, said plunger assembly including three balls fixedly attached thereto positioned at substantially 120° intervals around said axis and defining the inner surface of a cavity to be gauged, vibrator means mounted on said base for seating a gauged member onto said balls attached to said base; rods means slidably mounted in said base for damped motion along axes parallel to said aforementioned axis to cushion the flat surface of a gauged member from said base; and means responsive to motion of said plunger relative to said base for indicating deviation of the position of the flat surface of a gauged member from the position of the equator of the spherical cavity of such a gauged member.

5. A gauge for determining the deviation of a surface of a gauged member from the position of the true equator of a spherical cavity formed in said member comprising: base means having a first plurality of sperical projections positioned thereon tangent to a plane and adapted to be contiguous with the flat surface of a gauged member; plunger means slidably supported for translation along an axis perpendicular to said plane relative to said base means; a second plurality of spherical projections positioned upon said plunger means tangent to a hemisphere whose equator is at said plane and adapted to be positioned contiguous with the surface of a spherical cavity in a member to be gauged; detector means operatively connected to said plunger means to detect motion of said plunger means relative to said base means; and indicator means responsive to the output of said detector means for indicating the displacement of said plunger means relative to said base means.

References Cited by the Examiner
UNITED STATES PATENTS 2,331,987 10/43 Leatherman _____ 33—174
2,396,383 3/46 Moore.
2,483,060 9/49 Niedelman et al. _____ 33—174 X
2,599,835 6/52 Johnson et al. _____ 33—169 X ISAAC LISANN, *Primary Examiner.*

UNITED STATES PATENT OFFICE
CERTIFICATE OF CORRECTION

Patent No. 3,197,879                                                  August 3, 1965

Richard M. Chapman

It is hereby certified that error appears in the above numbered patent requiring correction and that the said Letters Patent should read as corrected below.

Column 4, line 32, before "a flat" insert -- of --; line 61, after "means" insert -- mounted --.

Signed and sealed this 17th day of May 1966.

(SEAL)
Attest:

ERNEST W. SWIDER                                          EDWARD J. BRENNER
Attesting Officer                                              Commissioner of Patents